United States Patent [19]

Bailey

[11] Patent Number: 4,569,011

[45] Date of Patent: Feb. 4, 1986

[54] CONSTANT CURRENT DRIVE FOR SWITCHING POWER SUPPLY

[75] Inventor: Carl J. Bailey, San Jose, Calif.

[73] Assignee: Tandem Computers Incorporated, Cupertino, Calif.

[21] Appl. No.: 551,299

[22] Filed: Nov. 14, 1983

[51] Int. Cl.[4] .................. H02P 13/20; H02M 7/537
[52] U.S. Cl. .................................. 363/98; 363/132; 307/270
[58] Field of Search ............... 363/17, 97–98, 363/132–134; 323/289; 307/270

[56] References Cited

U.S. PATENT DOCUMENTS

| | | | |
|---|---|---|---|
| 3,683,208 | 8/1972 | Burens | 363/134 X |
| 3,820,008 | 6/1974 | Guarnaschelli | 323/289 |
| 4,025,843 | 5/1977 | Parker | 323/289 |
| 4,302,807 | 11/1981 | Mentler | 363/134 |

FOREIGN PATENT DOCUMENTS 0139024  10/1979  Japan ..................... 363/98

Primary Examiner—Peter S. Wong
Attorney, Agent, or Firm—Lyon & Lyon

[57] ABSTRACT

A switching power supply uses constant current sources, switching transistors and current coupled transformers for switching current through the switching power supply. The switching current is proportional to the current of the constant current sources. The use of constant currents to drive output transistors of the switching power supply improves the efficiency of the switching power supply and desensitizes the switching power supply to variations in unregulated power sources.

12 Claims, 3 Drawing Figures

CONSTANT CURRENT DRIVE FOR SWITCHING POWER SUPPLY

BACKGROUND

This invention relates to switching circuits and more particularly to a constant current drive for a switching power supply.

Switching circuits contained within a switching power supply use switching transistors. The switching transistors switch current bidirectionally through a high frequency step down transformer. The current is supplied by a high voltage rectified and filtered signal from an input transformer. The switching transistors switch the current at a relatively high frequency in the order of tens of kilohertz. The high frequency step down transformer is physically smaller than low frequency transformers and may contain multiple taps on its secondary windings. The taps provide multiple voltages that are to be rectified, filtered, regulated and distributed to various logic modules within an electronic system.

The switching circuits include an input transistor switching stage, a transformer coupling stage and an output transistor switching stage. The output transistor switching stage drives a primary winding of the high frequency step down transformer. The primary winding of the high frequency step down transformer carries bidirectional current received from a high frequency high voltage input signal. The coupling transformer stage is used in a voltage coupling mode and couples a voltage level onto the output switching transistors of the output switching transistor stage. The coupled voltage onto the output switching stage is coupled across a series connected base resistor and a base-emitter junction of an output transistor. Because of the variable base-emitter resistance, the base current of the output transistor switching stage is difficult to control and consequently, a resulting collector current is then difficult to control as is the resulting transistor current into the high frequency step down transformer.

However, a series base resistor is used to solve or minimize these problems by desensitizing the output transistor current to the variable base-emitter resistance. The resistance of the base resistor used is much greater than the base-emitter resistance, and it is not variable and thereby dominates the base-emitter resistance. The use of such a base resistor thus controls the base current drive. However, the use of a base resistor in a series connection to the base of the transistor causes large power dissipation to occur in the base resistor. The power loss disadvantageously decreases the efficiency of the power supply.

The voltage drive to the high frequency step down transformer will decay to zero or increases exponentially to the supply voltage when the voltage drive to an output transistor is turned off or on, respectively. Slow turn-on and slow turn-off times cause the output switching transistors to dissipate large amounts of power during switching. This power dissipation disadvantageously decreases the efficiency of the switching power supplies.

A standard design of the input transistor stage comprises NPN transistors with the emitters thereof grounded. The collectors are connected to the coupling transformer. Logic control signals applied to the bases will cause their respective transistors to conduct. A resulting voltage is thereby applied across the primary windings of the coupling transformers. The collector of each of the input transistors is connected to the respective ends of the primary windings of the coupling transformers. The center tap of each of the primary windings is connected to a voltage source. This voltage source that is connected to the center taps of the primary windings of the coupling transformers, is usually a regulated power source which provides a controlled voltage across the secondary windings and the base resistors and base emitter junction of each of their respective output switching transistors. Thus, traditional switching circuits in switching power supplies disadvantageously use an expensive regulated voltage source to control the voltage applied to output switching transistors.

SUMMARY

It is an object of the present invention to provide constant currents into bases of output transistors. These constant currents eliminate the need for series base resistors. Additionally, it is an object of the present invention to use current coupling transformers. These current coupling transformers do not require a regulated voltage supply source. The current coupling transformers are able to source and sink currents into bases of the output transistors. This sourcing and sinking capability substantially decreases the turn-on and turn-off time of the output switching transistor. This results in lower power dissipation in the output switching transistors.

As before, the input switching transistors have their emitters connected together, but in the present invention the emitters are connected to a constant current source. The resulting collector currents of each pair of input transistors is equal to the current supplied by one of the constant current sources. The collector currents are drawn through their respective primary winding of their respective coupling transformer. Consequently, constant currents through respective secondary windings of the respective coupling transformers results. These resulting currents enter or leave the bases of respective output switching transistors. These constant currents eliminate the need for a regulated voltage source connected to the center taps of primary windings of the coupling transformers. The coupling transformers are used in a current coupling mode rather than a voltage coupling mode and the constant currents of the secondary windings of the coupling transformers are bidirectional.

A benefit of the constant currents entering or leaving the bases of the output transistors is a fast turn-on when current is entering an output transistor and fast turn-off when current is leaving an output transistor.

Another benefit is the lack of power dissipating base resistors. Variable base-emitter resistance of an output switching transistor does not substantially affect the current entering or leaving the base of an output transistor.

Another advantage of using constant current through a coupling transformer is that an unregulated power source connected to the center taps of the primary windings of the coupling transformers can be used.

DRAWING DESCRIPTIONS

PREFERRED EMBODIMENT

Figure 1:
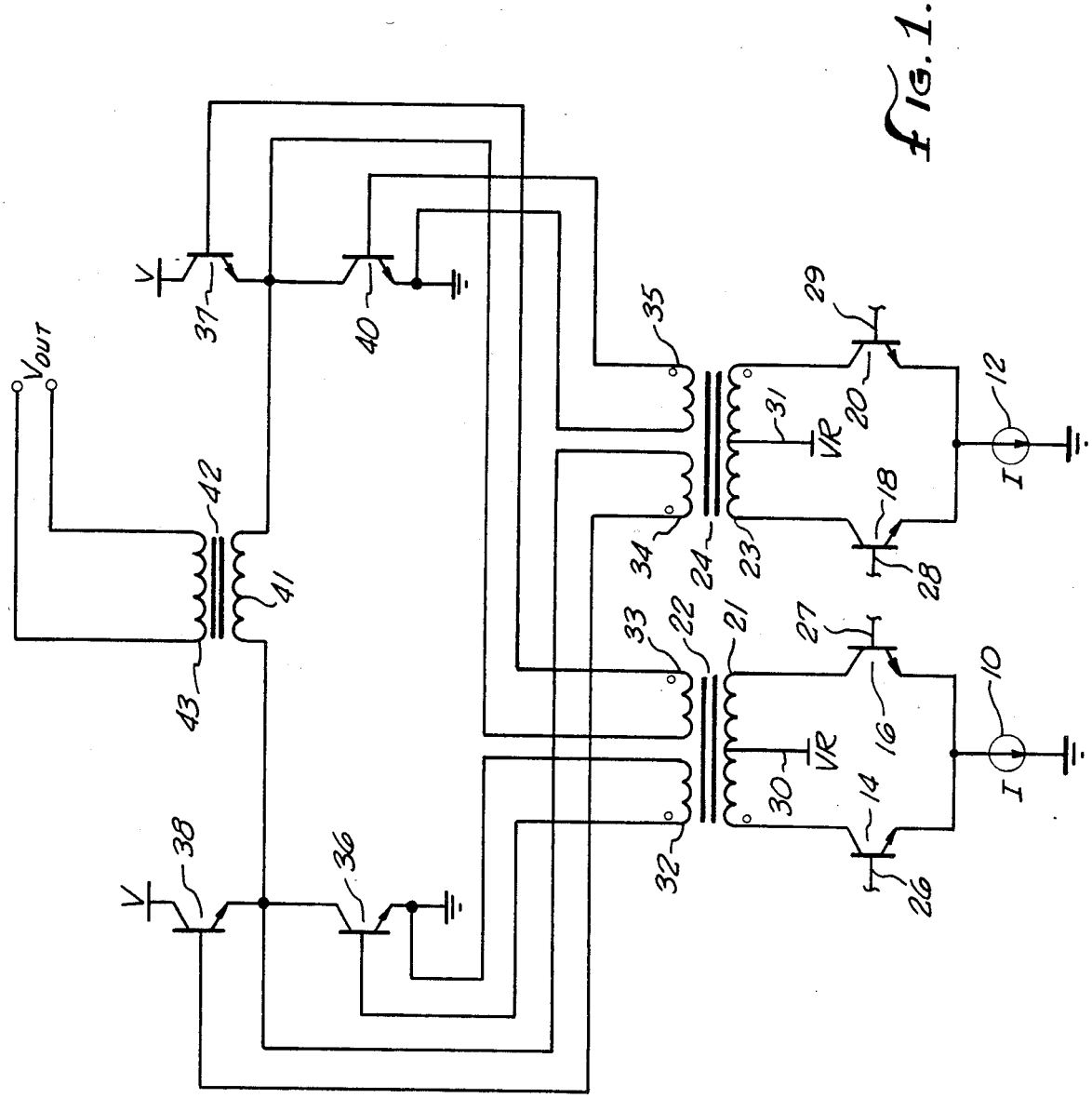
FIG. 1 is a schematic of the electronic circuits representing the circuits connected to the high frequency step down transformer.

Referring to FIG. 1, current I exists through each of two constant current sources 10 and 12. Each is separately connected to emitters of a pair of switching transistors 14 and 16, and 18 and 20 which are emitter coupled. The current in the current sources has a constant value I. The current through a pair of emitters of each of the pair of input transistors 14 and 16, and 18 and 20, must sum to the value I.

The current in each of the collectors plus their respective negligible base current of their respective input switching transistors 14, 16, 18 and 20 equals the current in their respective emitters. Therefore, the sum of the collector currents of each pair of each input switching transistor pair 14 and 16, and 18 and 20 almost equals the current of the constant current sources 10 and 12, respectively.

Because of the emitter coupled configuration of the paired input switching transistors 14 and 16, and 18 and 20, an opposite switching mode of operation exists in each pair. The paired input transistors operate in an opposite switching mode in that one transistor (e.g. 14) is on and carrying all of the current I of the current source (e.g. 10) while the other one (e.g. 16) is off carrying none of the current. Only during a small transitory period do the currents in the input switching transistors share the current drawn by the constant current source (e.g. 10). During the switching of these input switching transistors, the current in a transistor (e.g. 14) rises from zero to I as the other paired transistor (e.g. 16) equally but oppositely falls from I to zero.

The collectors of the input switching transistors 14 and 16, and 18 and 20 are connected to the primary winding ends of primary windings 21 and 23, respectively, of the coupling transformers 22 and 24, respectively. The center taps of the primary windings are connected to an unregulated voltage supply VR, not shown. Transformers 22 and 24 operate in a current coupling mode effectuated by signals on lines 26 and 27, and 28 and 29 respectively.

The voltage supply VR, not shown, that is connected to the center taps on lines 30 and 31 of the primary windings 21 and 23, respectively, of the current coupling transformers 22 and 24, respectively, need not be regulated and is not critical. However, the voltage level of this supply must be within some gross positive value and supply the needed current.

Each of the coupling transformers 22 and 24 has two secondary windings 32 and 33, 34 and 35, respectively, that drive four output transistors 36, 37, 38 and 40, respectively. An output transistor stage comprising the four output switching transistors 36, 37, 38 and 40 causes bidirectional currents through a primary winding 41 of a high frequency step down transformer 42. Current exists in one direction when transistors 38 and 40 are on while transistors 36 and 37 are off. Current exists in an opposite direction when transistors 37 and 36 are on while transistors 38 and 40 are off.

Figure 2:
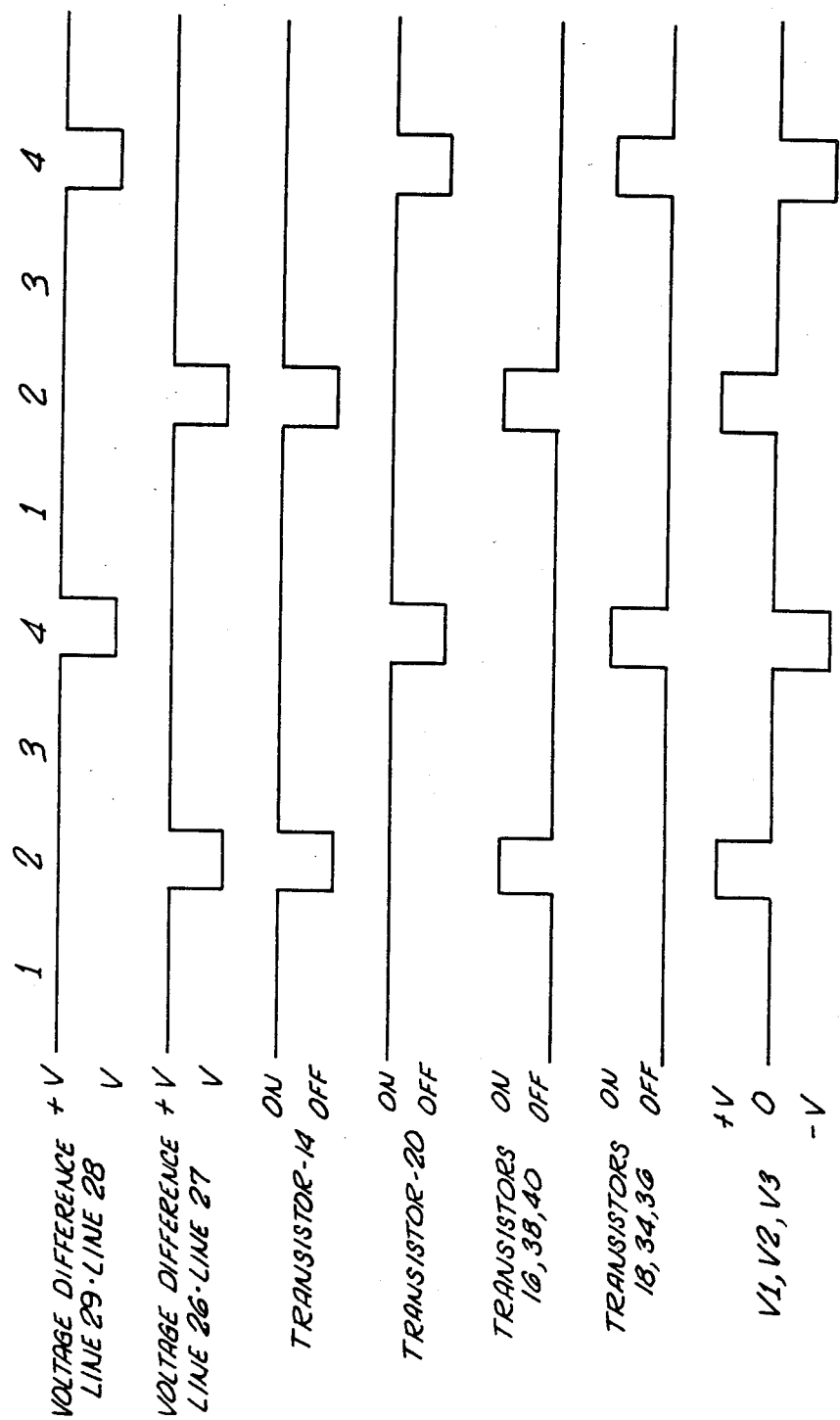
FIG. 2 is a waveform diagram of the states of the switching circuits.

Referring to FIG. 1 and FIG. 2, the switching circuit switches through four states that are cycled during normal operation of the power supply. The state conditions are as follows:

State 1—line 26 is high; transistor 14 is on; line 27 is low; transistor 16 is off; transistors 36 and 37 are off; line 28 is low; transistor 18 is off; line 29 is high; transistor 20 is on; transistors 38 and 40 are off.

State 2—line 26 is low; transistor 14 is off; line 27 is high; transistor 16 is on; transistors 36 and 37 are on; line 28 is low; transistor 18 is off; line 29 is high; transistor 20 is on; transistors 38 and 40 are off.

State 3—line 26 is high; transistor 14 is on; line 27 is low; transistor 16 is off; transistors 36 and 37 are off; line 28 is low; transistor 18 is off; line 29 is high; transistor 20 is on; transistors 38 and 40 are off.

State 4—line 26 is high; transistor 14 is on; line 27 is low; transistor 16 is off; transistors 36 and 37 are off; line 28 is high; transistor 18 is on; line 29 is low; transistor 20 is off; transistors 38 and 40 are on.

States one and three are identical. States one and three cause the current in the high frequency step down transformer 42 to decrease toward zero. During the states two and four, the current in the primary winding 41 of high frequency step down transformer 42 increases from zero. Current direction through the high frequency transformer 42 during state two is in opposite direction of current through the high frequency step own transformer 42 during state four. Alternating voltages are induced in a secondary winding 43 of the high frequency step down transformer 42.

Figure 3:
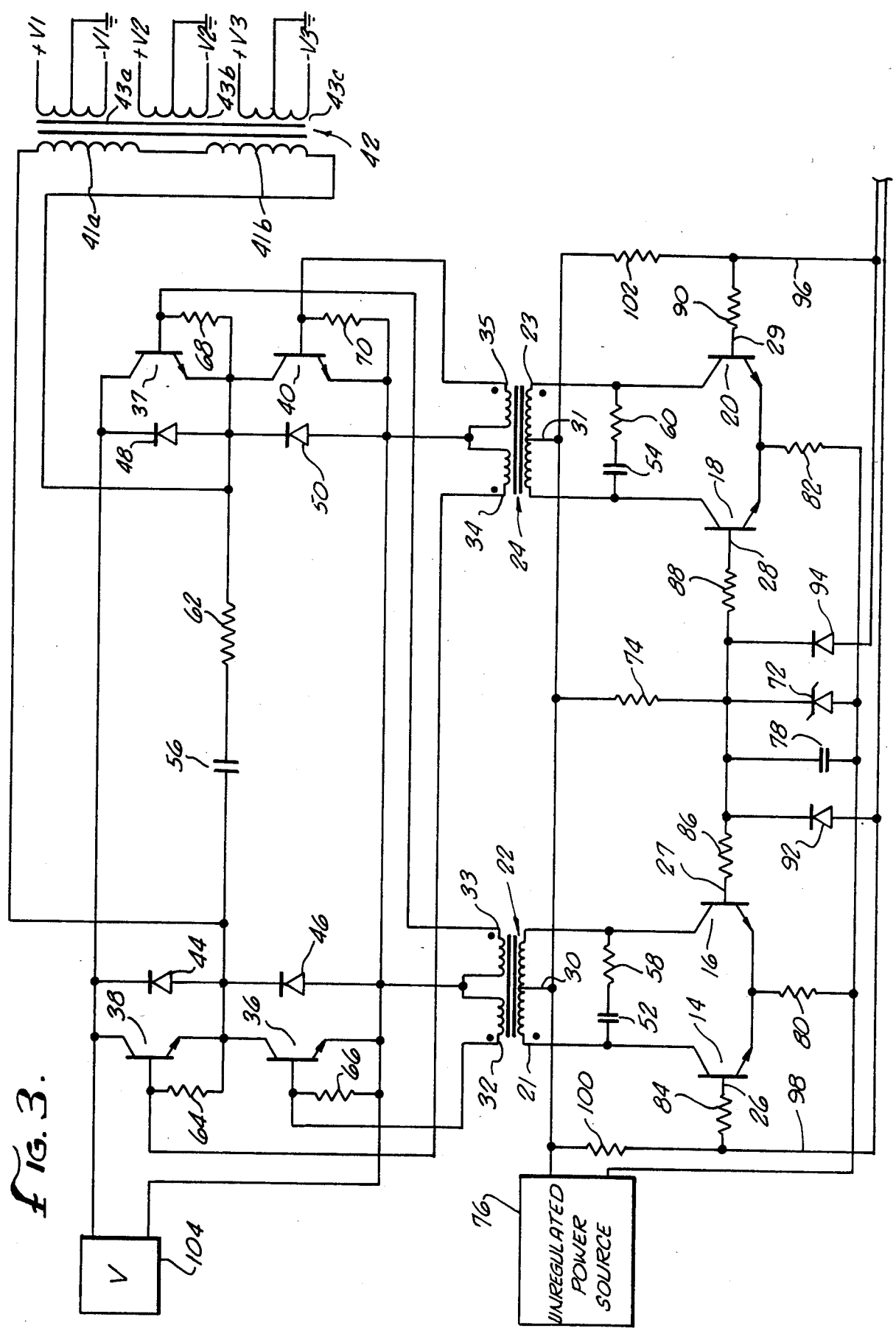
FIG. 3 is a detailed schematic of the switching circuits of FIG. 1.

Referring to FIG. 3, current rectifiers 44, 46, 48 and 50 protect the output transistors 38, 36, 37 and 40, respectively, from experiencing a high negative voltage across their respective collector-emitter terminals. Capacitors 52, 54 and 56 in series connection with resistors 58, 60 and 62, respectively, provide dampening and DC current blocking for their respective primary windings 21, 23 and 41a and 41b.

Resistors 64, 66, 68 and 70 are in a parallel connection to the base-emitter junctions of the output switching transistors 38, 36, 37 and 40, respectively. They are not in series connection between the base of the output switching transistors 36, 37, 38 and 40 and the secondary windings 32, 33 34 and 35, respectively, of the coupling transformers 22 and 24, respectively. The resistors 64, 66, 68 and 70 are used to conduct leakage currents and protect the output switching transistors 38, 36, 37 and 40, respectively, from reverse (or sink) currents leaving the base of the output switching transistors 38, 36, 37 and 40, respectively. The reverse current through these base-emitter resistors produces a base-emitter voltage that does not exceed the breakdown voltage of the output transistors 36, 37, 38 and 40.

One way of providing a constant current source is that shown in FIG. 3. A zener diode 72 is connected through resistor 74 to an unregulated power source 76. The zener diode 72 regulates a constant voltage across itself. Substantial variations in the unregulated power source 76 do not cause a substantial change of the voltage across the zener diode 72. The bases of the input switching transistors 14, 16, 18 and 20 remain at a fairly constant voltage level equal to that of the zener voltage. A capacitor 78 filters transients across the zener diode 72.

The constant current I is drawn from each pair of emitter coupled input switching transistors 14 and 16, and 18 and 20. Resistors 80 and 82 are equal and establish the constant current in each pair of input switching transistors 14 and 16, and 18 and 20, respectively. Resistors 84, 86, 88 and 90 are equal to each other and bias the input transistors 14, 16, 18 and 20, respectively. The constant current I is equal to the quotient of the zener voltage minus the sum of a base-emitter junction voltage plus a negligible voltage across resistor 86, divided by the resistance of resistor 80.

Current rectifiers 92 and 94 turn on only one of the transistors of each pair of input switching transistors 14 and 16, and 18 and 20. Only two input lines 96 and 98 are required to cycle the switching circuit through its four states. Resistors 100 and 102 are used to bias the input transistors 14 and 20, respectively. The lines 27 and 28 remain at the zener voltage level of the zener diode 72, while the signal level on lines 26 and 29 changes with the signals on lines 98 and 96, respectively. The signals on lines 96 and 98 toggle between ground and the unregulated power source 96. Thus, the voltage difference of line 29 minus line 28 is in phase with the signal on line 96 and the voltage difference of line 26 minus line 27 is in phase with the signal on line 96.

A small voltage difference on lines 26 and 28 can cause a fast current switching in transistors 14 and 16. Likewise, a small voltage difference on lines 30 and 32 can cause a fast current switching in the input transistor and 20. The transistor 20 is on and the transistor 18 is off when line 96 is in high voltage state. The transistor 18 is on and the transistor 20 is off when line 96 is in a low voltage state. The transistor 14 is on and the transistor 16 is off when line 98 is in high voltage state. The transistor 16 is on and the transistor 14 is off when line 98 is in low voltage state.

It should now become apparent that a change in the voltage on input line 96 causes a fast toggling or switching in input transistors 14 and 16. Likewise, a voltage change on the input line 98 causes a fast toggling or switching in the input transistors 18 and 20. A toggling of the transistors 14 and 16 causes output transistors 38 and 40 to toggle. A toggling of transistors 18 and 20 causes a toggling of the output transistors 36 and 37. This toggling of the output transistors 36 and 37 and 38 and 40 produces the switching of the bidirectional currents through the high frequency step down transformer 42 as reflected in FIG. 2.

What is claimed is:

1. A switching system for generating drive currents in a plurality of directions through an output transformer means, comprising;

a plurality of current source means each of which is for supplying a constant current, a plurality of input transistor means each of which is connected to one of said plurality of current source means providing a plurality of input transistor outputs for each of said plurality of input transistor means, and one of said input transistor outputs of each of said plurality of input transistor means supplies all of said constant current where the remainder of said plurality of input transistor outputs of each of said plurality of input transistor means supply none of said constant current except during a transition period, and each of said input transistor outputs of each said plurality of said input transistor means supply said constant current in turn and in sequential order, a plurality of transformer means each of which is connected through said plurality of input transistor outputs to one of said plurality of input transistor means for providing a plurality of transformer outputs and for coupling said plurality of input transistor outputs to said plurality of transformer outputs, and each of said plurality of transformer outputs supplies a proportional constant current that is proportion to said current of said current source means, and a plurality of output transistor means each of which is connected to said plurality of transformer outputs of one of said transformer means and each of said output transistor means is also connected to said output transformer means for supplying multiple direction current to said output transformer means and for receiving said proportional constant current from said plurality of transformer outputs of one of said plurality of transformer means.

2. The plurality of current source means of claim 1, comprising, voltage reference means connected to said input transistor means for supplying a reference voltage thereto, and a plurality of resistor means each of which is connected to one of said plurality of input transistor means for establishing a constant current through said input transistor means dependent upon said voltage reference means.

3. The plurality of input transistor means of claim 1, each of which comprises coupled input transistor means connected to one of said plurality of transformer means for supplying constant current therein.

4. The plurality of transformer means of claim 1, each of which comprises primary winding means connected to one of said plurality of input transistor means for conducting said constant current, and a plurality of secondary winding means connected to said plurality of output transistor means for providing constant current to said output transistor means for switching said output transistor means.

5. The output transistor means of claim 1, each of which comprises output coupled transistor means connected to one of said plurality of transformer means and to said output transformer means for supplying multiple direction current through said output transformer means.

6. A switching system for generating drive currents in a plurality of directions through output transformer means, comprising first current source means for supplying constant current, second current source means for supplying constant current, first and second input transistor means respectively connected to said first and second current source means for providing a plurality of outputs for each of said input transistor means, and one of said outputs of each of said input transistor means supplying all of the constant current and the other of said outputs of each of said transistor means supplying none of the constant current at a time except during a switching period, and each of said outputs of each said transistor means supplying constant current in turn and in sequential order, first and second transformer means respectively connected through said transistor outputs to a respective one of said input transistor means for providing a plurality of transformer outputs and for coupling said input transistor outputs to said plurality of transformer outputs for supplying a proportional constant current that is proportional of the current of said current source means, and a plurality of output transistor means, each of which is connected to one of said transformer outputs of said first and second transformer means for receiving the proportional constant current from one of said plurality of transformer outputs of one of said plurality of transformer means, and each of said output transistor means being connected to said output transformer means for supplying multiple direction current to said transformer means.

7. A switching system as in claim 6 wherein each of said input transistor means comprises a pair of coupled input transistors connected to a respective one of said first and second transformer means for supplying a constant current thereto.

8. A switching system as in claim 6 wherein the first and second transformer means each comprises a primary winding connected to a respective one of said input transistor means for conducting the constant current, and a plurality of secondary windings connected to said plurality of output transistor means for providing proportional constant current to said output transistor means for switching said output transistor means.

9. A switching system as in claim 6 wherein the output transistor means each comprises coupled transistors connected to one of said first and second transformer means and to said output transformer means for supplying multiple direction current through said output transformer means.

10. A constant current drive circuit in a switching power supply with an output transformer comprising
input switching stage means for supplying a plurality of outputs, each of which supplies a constant current at different times,
transformer means for current coupling the constant current between primary windings and secondary windings of said transformer means, said primary windings being connected to said outputs of said input switching means for receiving said constant current, said transformer means coupling a proportional constant current to said secondary windings, and
output switching stage means for supplying current to said output transformer, said output switching stage means being connected to said secondary windings, said proportional constant current being supplied to said output switching stage means through said secondary windings, said output switching stage means being connected to said output transformer for supplying said output transformer with multiple direction current.

11. The constant current drive circuit of claim 10 wherein said input switching stage means comprises
a plurality of emitter coupled transistors for switching current and for providing a plurality of outputs,
a reference voltage source for supplying a reference voltage, said reference voltage being connected to said plurality of emitter coupled transistors, and
resistor means for establishing a constant current in said plurality of emitter coupled transistors, said resistor means being connected to said plurality of emitter coupled transistors.

12. The constant current drive circuit of claim 10 wherein said transformer means comprises
a plurality of primary windings, one of which conducts said constant current at any one time with each of said plurality of primary windings being connected to one of said outputs of said input switching stage, said primary windings having a center tap connected to a voltage source which may be unregulated, and
a plurality of secondary windings with respective outputs for supplying the proportional constant current.

* * * * *